(12) United States Patent
Kishi

(10) Patent No.: US 10,870,289 B2
(45) Date of Patent: Dec. 22, 2020

(54) INKJET RECORDING APPARATUS

(71) Applicant: KYOCERA Document Solutions Inc., Osaka (JP)

(72) Inventor: Yoshitaka Kishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/551,010

(22) Filed: Aug. 26, 2019

(65) Prior Publication Data
US 2020/0062006 A1 Feb. 27, 2020

(30) Foreign Application Priority Data

Aug. 27, 2018 (JP) .................. 2018-158403

(51) Int. Cl.
*B41J 3/407* (2006.01)
*B41J 15/16* (2006.01)
*H04N 1/12* (2006.01)
*B41J 15/04* (2006.01)

(52) U.S. Cl.
CPC ........... *B41J 3/4078* (2013.01); *B41J 15/048* (2013.01); *B41J 15/165* (2013.01); *H04N 1/128* (2013.01)

(58) Field of Classification Search
CPC ... B41J 3/60; B41J 3/407; B41J 15/048; B41J 15/165; B41J 3/4078; H04N 1/128
See application file for complete search history.

(56) References Cited

U.S. PATENT DOCUMENTS

| 6,499,822 B1 | 12/2002 | Abe et al. |
| 6,712,444 B2 | 3/2004 | Abe et al. |
| 2003/0030686 A1 | 2/2003 | Abe et al. |
| 2011/0316925 A1* | 12/2011 | Saita .................. B41J 3/60 347/19 |
| 2012/0020689 A1* | 1/2012 | Inoue ................. G03G 15/6517 399/68 |

FOREIGN PATENT DOCUMENTS

JP H11-315484 A 11/1999

* cited by examiner

*Primary Examiner* — Jannelle M Lebron
(74) *Attorney, Agent, or Firm* — Studebaker & Brackett PC

(57) ABSTRACT

A recording head in an inkjet recording apparatus forms an image on paper using ink. A first sheet of paper has first and second sides. A second sheet of paper has third and fourth sides. The recording head forms a first image and a first mark image on the first side based on first image data, and then a second image and a second mark image on the second side based on second image data. The first mark image represents a first reference location in a first rectangular region in which the first image is to be formed. The second mark image represents a second reference location in a second rectangular region in which the second image is to be formed. A controller determines an enlargement ratio of the second image to be formed on the fourth side based on a discrepancy between the first and second reference locations.

8 Claims, 9 Drawing Sheets

INKJET RECORDING APPARATUS

INCORPORATION BY REFERENCE

The present application claims priority under 35 U.S.C. § 119 to Japanese Patent Application No. 2018-158403, filed on Aug. 27, 2018. The contents of this application are incorporated herein by reference in their entirety.

BACKGROUND

The present disclosure relates to an inkjet recording apparatus.

There are known inkjet recording apparatuses configured to perform printing by using ink on both sides of a stretchable recording medium such as cloth or fabric. An inkjet recording apparatus of such inkjet recording apparatuses forms an image on either side (a first side) of a recording medium while forming, together with the image on the first side, divisional lines for dividing the whole of the image on the first side into tile-shaped regions. The inkjet recording apparatus also corrects image data corresponding to a unit tile image forming a tile-shaped region according to the distortion of corresponding divisional lines, thereby forming an image on a back side (a second side) of the recording medium. The inkjet recording apparatus enables duplex printing on the both sides of the recording medium such that the image on the second side of the recording medium becomes a mirror image of the image on the first side.

SUMMARY

An inkjet recording apparatus according to the present disclosure includes a paper conveyance mechanism, a recording head, and a controller. The paper conveyance mechanism conveys plural sheets of paper. The recording head forms, by using ink, an image on each of the sheets of paper being conveyed based on image data. The controller controls respective operations of the paper conveyance mechanism and the recording head. The sheets of paper include a first sheet of paper and a second sheet of paper. The first sheet of paper has a first side and a second side being a back side of the first side. The second sheet of paper has a third side and a fourth side being a back side of the third side. The image data contains first image data representing a first image and second image data representing a second image. The recording head forms the first image and a first mark image on the first side based on the first image data, and then forms the second image and a second mark image on the second side based on the second image data. The first mark image represents a first reference location in a first rectangular region in which the first image is to be formed. The second mark image represents a second reference location in a second rectangular region in which the second image is to be formed. The controller determines an enlargement ratio of the second image to be formed on the fourth side based on a discrepancy between the first reference location and the second reference location.

DETAILED DESCRIPTION

Figure 1A:
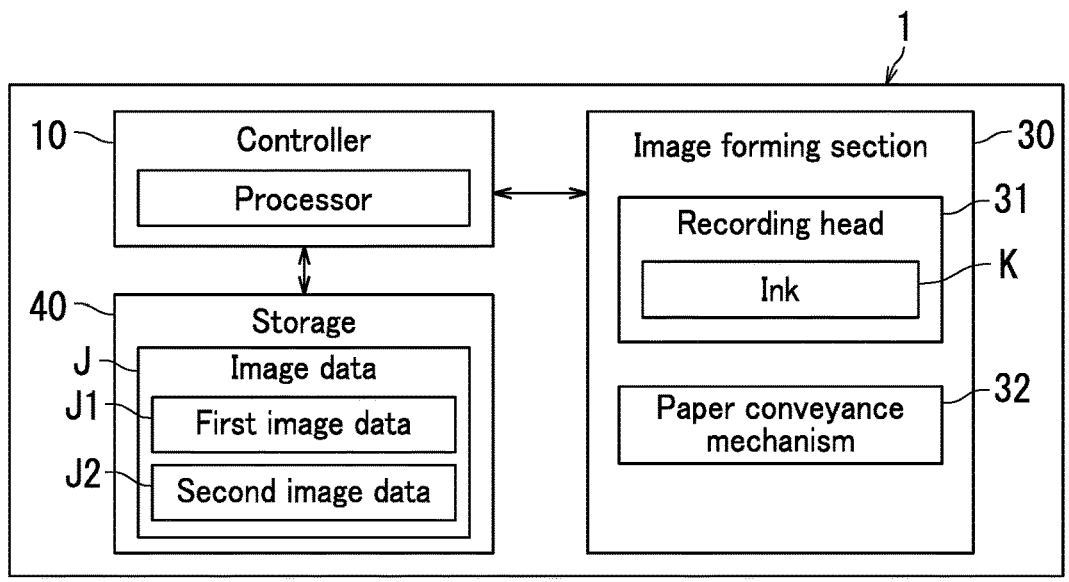
FIG. 1A is a constitutional diagram of an inkjet recording apparatus according to an embodiment of the present disclosure.

An embodiment of the present disclosure will hereinafter be described with reference to the drawings. Note that identical or equivalent elements in the drawings are assigned the same reference numerals as depicted therein, and description thereof is omitted as appropriate. In addition, in the present embodiment, X- and Y-axes are parallel to a horizontal axis, and a Z-axis is parallel to a vertical axis. X-, Y- and Z-axes are perpendicular to each other. The direction along the X-axis is an example of a "sub-scanning direction" of the present disclosure. The direction along the Y-axis is an example of a "main scanning direction" of the present disclosure.

Figure 1B:
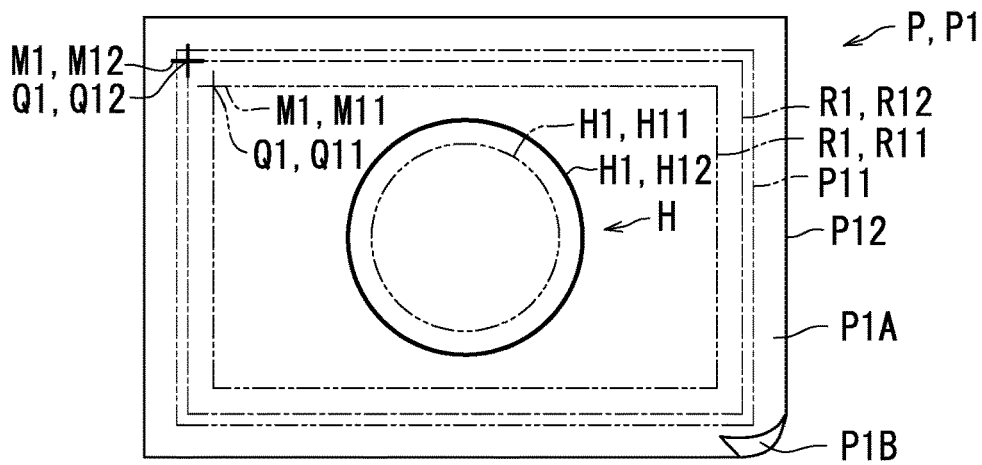
FIGS. 1B and 1C illustrate a first sheet of paper.
Figure 1C:
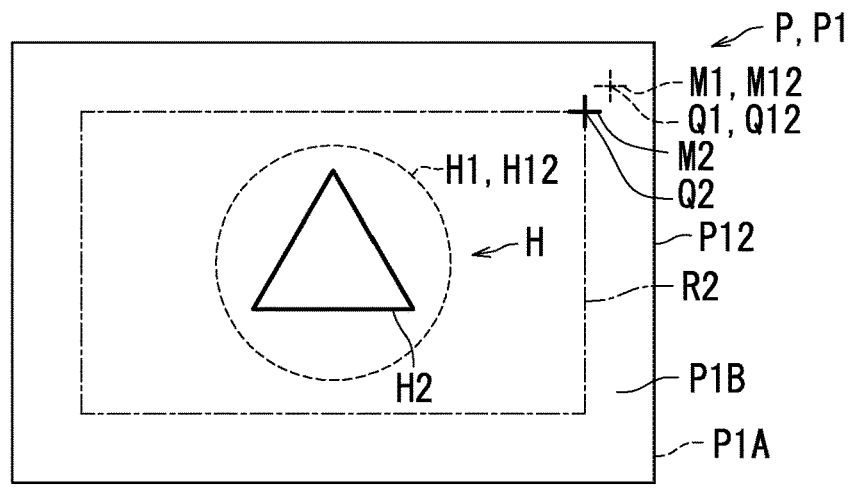

An inkjet recording apparatus 1 according to the embodiment of the present disclosure will be described with reference to FIGS. 1A, 1B and 1C. FIG. 1A is a constitutional diagram of the inkjet recording apparatus 1. FIGS. 1B and 1C illustrate a first sheet of paper P1. Examples of the inkjet recording apparatus 1 include a printer, a copier, a facsimile machine and a multifunction peripheral equipped with those functions.

As illustrated in FIG. 1A, the inkjet recording apparatus 1 includes storage 40, a controller 10, and an image forming section 30. The storage 40 is composed of a Hard Disk Drive (HDD), Random Access Memory (RAM) and Read Only Memory (ROM). The storage 40 stores different pieces of data, a control program, and an application program. The control program includes instructions which, when the program is executed by the controller 10 (a computer), cause the controller 10 to carry out the steps of control for component operations of the inkjet recording apparatus 1.

The storage 40 stores, for examples image data J as the different pieces of data. The image data J represent an image. Examples represented by the image include symbols such as letters, figures, and a combination of the symbols and figures. The image data J are a group of values of pixels (hereinafter, the values of pixels are referred to as pixel values). The pixels are arranged in a matrix along row and column directions, and each of the pixels is assigned a pixel value. Examples of each pixel value of the pixel data include a concentration and luminance.

The image data J is provided as a data set that contains first image data J1 and second image data J2. The first image data J1 represent a first image. The second image data J2 represent a second image. The first and second images may be the same as or different from each other.

The controller 10 is a hardware circuit including a processor such as a Central Processing Unit (CPU). The processor reads and carries out the control program stored in the storage 40, thereby causing the controller 10 to control the component operations of the inkjet recording apparatus 1. Examples to be controlled by the controller 10 include respective operations of a recording head 31 and a paper conveyance mechanism 32. The processor also reads and carries out the application program stored in the storage 40.

The image forming section 30 includes the paper conveyance mechanism 32 and the recording head 31. The paper conveyance mechanism 32 transfers (each sheet of) paper.

Note that the configuration of the paper conveyance mechanism 32 will be described in detail later with reference to FIG. 3.

The recording head 31 forms, based on the image data J, an image by using ink K on the (a sheet of) paper being transferred. Hereinafter, the operation of the image forming section 30 forming the image on paper by using the ink K thereon based on the image data J is also described as "printing".

The (sheets of) paper includes a first sheet of paper and a second sheet of paper. Examples of the paper include plain paper, coated paper, and matte paper. The paper is, for example rectangular. The first sheet of paper has a first side and a second side. The second side is a back side of the first side. The first sheet of paper is, for example a sheet of A4 size plain paper. The second sheet of paper has a third side and a fourth side. The fourth side is a back side of the third side. It is preferable that the second sheet of paper have the same quality and shape as those of the first sheet of paper. For example, in the case where the first sheet of paper is a sheet of A4 size plain paper, the second sheet of paper is also a sheet of A4 size plain paper.

The ink K is a liquid such as water-based ink. Mainly, water exemplifies solvent of the water-based ink. A quantity of the ink K deposited on paper by the recording head 31 is to be increased in proportion to, for example, the size, complexity, and colored area of the image formed on the paper.

The paper is apt to expand in the case of water-based ink in general because water penetrates into fibers constituting paper, thereby swelling the fibers. The paper is apt to expand, for example immediately after an image is formed on one of both sides of paper. The degree of such expansion depends on, for example, the coverage of image data or the type of paper. When an image is then formed on the other side, the paper is hard to expand more. The paper expanded may gradually return to the original size with the passage of time. For example, the paper expanded as a result of printing of an image onto one side returns to the original size when 24 hours elapse after the printing.

As shown in FIG. 1B, for example, the recording head 31 forms a first image H1 and a first mark image M1 on a first side P1A of the first sheet of paper P1 based on the first image data J1. The first image is, for example a graphic image representing a circle.

Examples of the first mark image M1 include cross-, L-, T- and dot-shaped graphic images. Preferably, the first mark image M1 does not overlap the first image H1. The first mark image M1 represents a first reference location Q1. In a case where the first mark image M1 is a cross-shaped graphic image, the first reference location Q1 is, for example an intersection position of the cross. The first reference location Q1 represents a reference location in a first rectangular region R1.

The first rectangular region R1 is a rectangular region in which the first image H1 is to be formed. Specifically, the first rectangular region R1 corresponds to a region where pixels of the first image data J1 are arranged. The first reference location Q1 needs to or may be located in the first rectangular region R1, and examples thereof include a vertex position(s) of the first rectangular region R1, a location(s) on frame lines thereof, and a center position thereof. In FIG. 1B, the first reference location Q1 is the position of a top left vertex of the first rectangular region R1.

The recording head 31 forming the first image H1 and the first mark image M1 on the first side P1A of the first sheet of paper P1 may cause expand the first sheet of paper P1 in a direction along the side. Here, a first sheet of paper P11, a first image H11, a first rectangular region R11, a first mark image M11, and a first reference location Q11 represent the first sheet of paper P1, the first image H1, the first rectangular region R1, the first mark image M1, and the first reference location Q1 when the first sheet of paper P1 does not expand, respectively. In addition, a first sheet of paper P12, a first image H12, a first rectangular region R12, a first mark image M12, and a first reference location Q12 represent the first sheet of paper P1, the first image H1, the first rectangular region R1, the first mark image M1, and the first reference location Q1 when the first sheet of paper P1 expands, respectively. Note that the expansion degrees in the figures below may be described exaggeratedly for convenience in order to make the figures easy to see.

FIG. 1C represents the first sheet of paper P1 expanded. As shown in FIG. 1C, after forming the first image H1 and the first mark image M1 on the first side P1A, the recording head 31 forms a second image H2 and a second mark image M2 on a second side P1B based on the second image data J2. The second image H2 is, for example a graphic image representing a triangle. Hereinafter, the operation of the image forming section 30 performing printing on both sides of paper P will also be described as "duplex printing".

The second mark image M2 is formed in the same way as the first mark image M1, and examples thereof include cross-, L-, T- and dot-shaped graphic images. Preferably, the second mark image M2 does not overlap the second image H2. The second mark image M2 represents a second reference location Q2. In a case where the second mark image M2 is a cross-shaped graphic image, the second reference location Q2 is, for example an intersection position of the cross. The second reference location Q2 represents a reference location in the second rectangular region R2.

The second rectangular region R2 is formed in the same way as the first rectangular region R1, and represents a rectangular region in which the second image H2 is to be formed. Specifically, the second rectangular region R2 corresponds to a region where pixels of the second image data J2 are arranged. The second reference location Q2 needs to or may be in the second rectangular region R2, and examples thereof include a vertex position(s) of the second rectangular region R2, a location(s) on the frame lines thereof, and a center position thereof. In FIG. 1C, the second reference location Q2 is the position of a top right vertex of the second rectangular region R2.

It is preferable that the shape of the second rectangular region R2 be the same as the shape of the first rectangular region R1. When the recording head 31 forms the image H on the first and second sides P1A and P1B in default settings, for example, upper and lower margins of the first sheet of paper P1 are set to the same value, and left and right margins thereof are also set to the same value. This enables the first rectangular region R1 on the first side P1A and the second rectangular region R2 on the second side P1B to overlap each other as seen through the first sheet of paper P1 from either side thereof, when the first sheet of paper P1 does not expand. That is, the first rectangular region R1 and the second rectangular region R2 are to overlap each other along the direction perpendicular to each side of the first sheet of paper P1.

The controller 10 determines an enlargement ratio of the second image H2 to be formed on the fourth side of the second sheet of paper based on a discrepancy (or a difference) between the first reference location Q1 and the second reference location Q2. For example, a user visually recognizes an interval of the discrepancy between the first reference location Q12 and the second reference location Q2 while looking through the first sheet of paper P1 from either side thereof. In FIG. 1C, the second reference location Q2 is shifted in a lower left direction relative to the first reference location Q12. When entering, into the inkjet recording apparatus 1, an instruction to perform duplex printing of the first and second images H1 and H2 on the second sheet of paper, the user enters an enlargement ratio specified instruction according to the interval recognized visually. The enlargement ratio specified instruction is an instruction for specifying an enlargement ratio of the second image data J2, thereby enlarging and forming the second image H2 on the second sheet of paper. The controller 10 also determines the enlargement ratio according to the enlargement ratio specified instruction. Note that the enlargement ratio will be described later in detail with reference to FIGS. 4 to 7.

As explained above with reference to FIGS. 1A, 1B, and 1C, the present embodiment enables the recording head 31 to form the image H on the sheets of paper P transferred by using the ink K thereon based on the image data J. The sheets of paper P include the first sheet of paper P1 and the second sheet of paper. The recording head 31 forms the first image H1 and the first mark image M1 on the first side P1A of the first sheet of paper P1 based on the first image data J1, and then forms the second image H2 and the second mark image M2 on the second side P1B of the first sheet of paper P1 based on the second image data J2. The controller 10 determines the enlargement ratio of the second image H2 to be formed on the fourth side of the second sheet of paper based on the discrepancy between the first reference location Q1 and the second reference location Q2. This enables, even when the first image H1 printed on either side of paper P expands due to the expansion of the paper P, the second image H2 to be enlarged and formed on the other side. It is therefore possible, after an image H is first printed on one side of paper to be output by duplex printing, to prevent an image H printed on the other side to easily be reduced. This results in suppression of misalignment between the image H on the front side and the image H on the back side through a simple configuration in duplex printing with the ink K on the paper P.

Figure 2A:
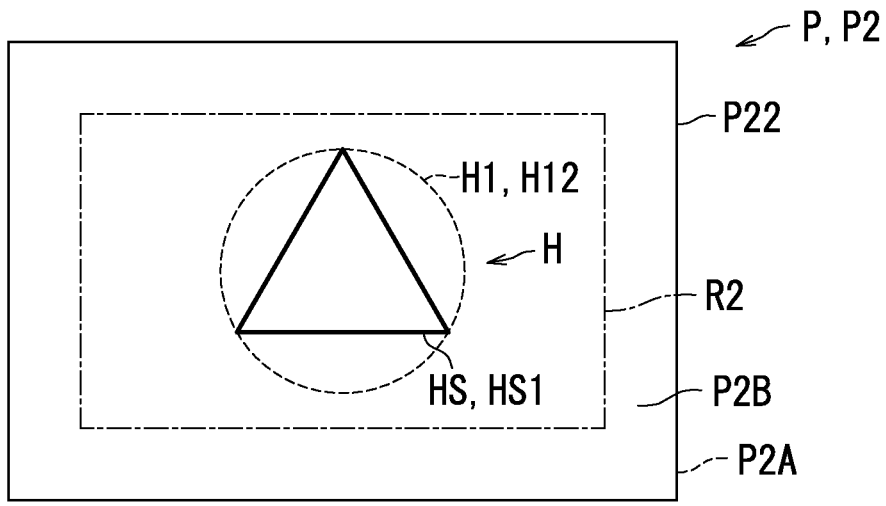
FIGS. 2A and 2B illustrate a second sheet of paper.
Figure 2B:
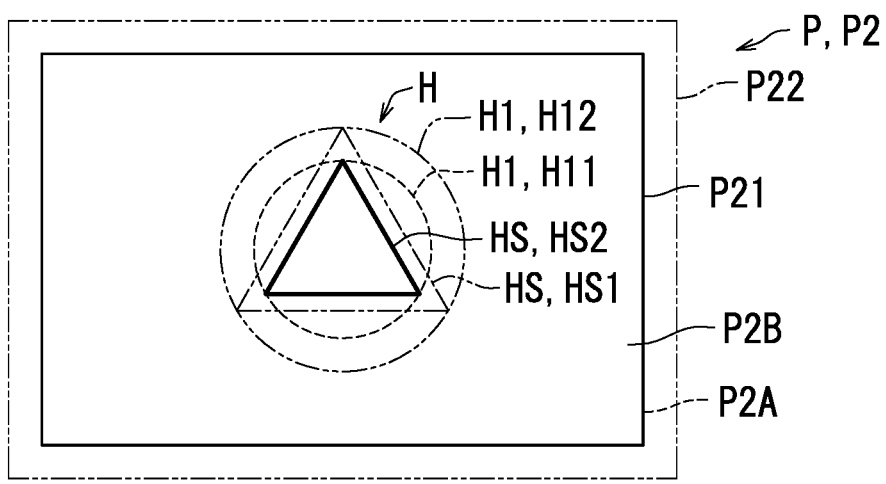

A process of the duplex printing on the second sheet of paper P2 will next be described with reference to FIGS. 2A and 2B besides FIGS. 1A, 1B and 1C. FIGS. 2A and 2B illustrate the second sheet of paper P2.

As shown in FIG. 2A, a recording head 31 forms a first image H1 on a third side P2A of a second sheet of paper P2 based on the first image data J1. This may cause the second sheet of paper P2 to expand. The recording head 31 then forms an enlarged second image HS on a fourth side 2B of the second sheet of paper P2 based on second image data J2 and an enlargement ratio. The enlarged second image HS is an image obtained by enlarging a second image H2 according to the enlargement ratio. Specifically, the enlarged second image HS1 is an image formed on the fourth side P2B by enlarging the second image data J2 (i.e., second image) according to the enlargement ratio that is determined based on a discrepancy between a first reference location Q1 and a second reference location Q2 of a first sheet of paper P1.

Here, a second sheet of paper P22 and an enlarged second image HS1 are the second sheet of paper P2 and the enlarged second image HS when the second sheet of paper P2 expands, respectively.

As shown in FIG. 2B, a second sheet of paper P21 and an enlarged second image HS2 are the second sheet of paper P2 and the enlarged second image HS when the second sheet of paper P2 does not expand, respectively. Examples of when the second sheet of paper P2 does not expand include when the second sheet of paper P2 expands and then returns to the original size.

As described above with reference to FIGS. 2A and 2B, the recording head 31 forms the first image H1 on the third side P2A of the second sheet of paper P2 based on the first image data J1, and forms the enlarged second image HS on the fourth side P2B based on the second image data and the enlargement ratio. It is therefore possible to reduce the discrepancy between respective images H on the both sides when duplex printing is performed with respect to the second sheet of paper P2, according to a result of test printing with respect to the first sheet of paper P1. The embodiment consequently enables a user to prevent printed matter from easily being output with printing quality degraded unintentionally.

The configuration and operation of the inkjet recording apparatus 1 will now be described in detail with reference to FIG. 3 besides FIGS. 1A to 2B. FIG. 3 illustrates the inkjet recording apparatus 1. The inkjet recording apparatus 1 is connectable to an external terminal device by wired or wireless communication via a network.

Figure 3:
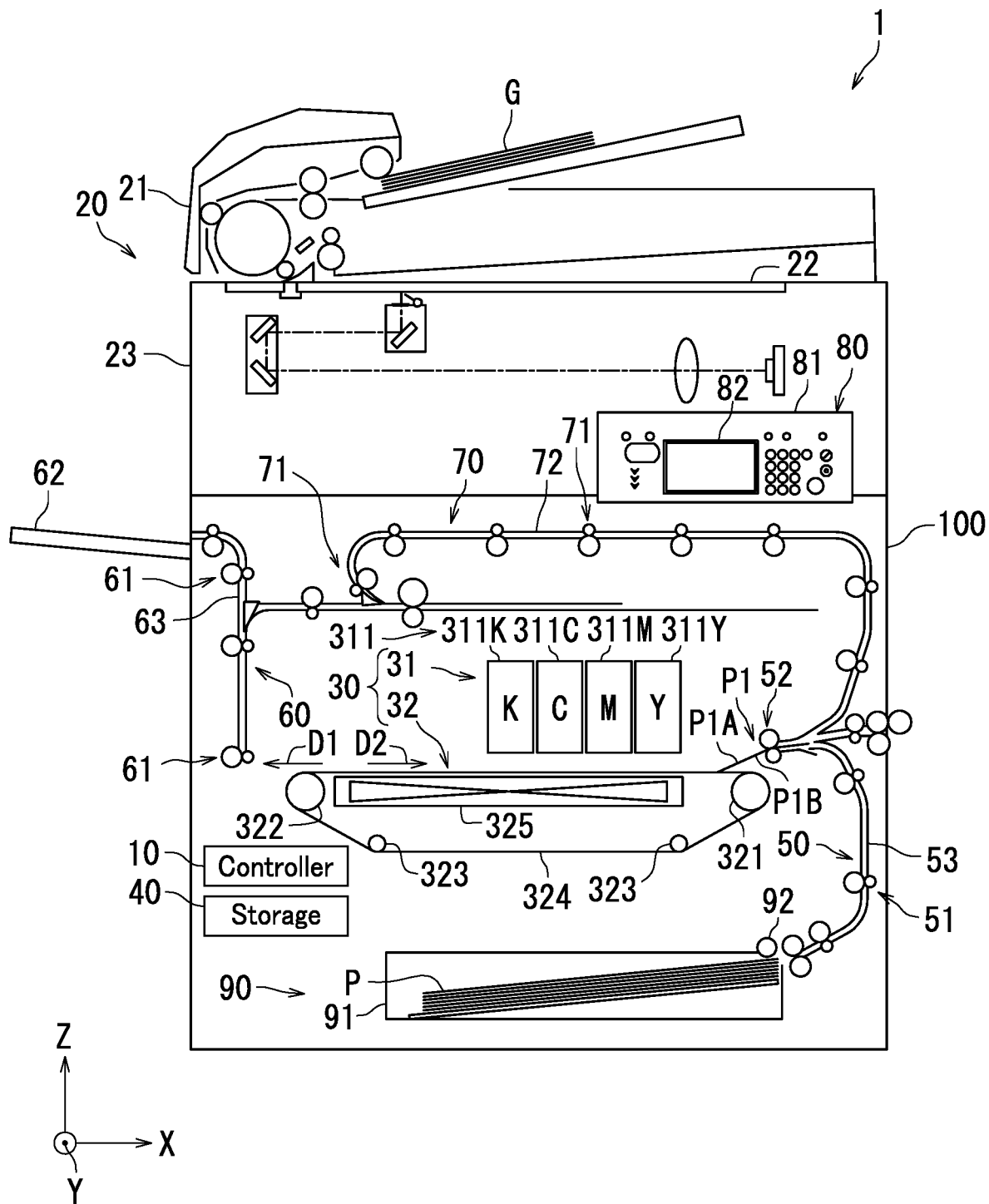
FIG. 3 illustrates the inkjet recording apparatus.

As shown in FIG. 3, in addition to the storage 40, the controller 10, and the image forming section 30 described with reference to FIG. 1A, the inkjet recording apparatus 1 includes an input display section 80, a reader 20, an apparatus housing 100, a paper feeder 90, a feed assembly 50, a paper exit assembly 60, and a reverse conveyance section (reverse assembly) 70. The controller 10 controls component operations of the inkjet recording apparatus 1 to form an image H represented by image data J on either side or both sides of paper P. The controller 10 may calculate a size of a discrepancy between a first reference location Q1 and a second reference location based on a reading result by the reader 20. Note that the calculation of the size of the discrepancy will be described later with reference to FIGS. 6A and 6B.

The input display section 80 includes an input section 81 and a display section 82. The input display section 80 is, for example an operation panel. The input section 81 receives different instructions according to user operations. Specifically, the input section 81 has, for example a touch screen function and different hardware buttons. Examples of the different instructions include an enlargement ratio specified instruction, a duplex printing instruction, a document reading instruction, and different setting instructions. The duplex printing instruction is an instruction to perform duplex printing based on the image data J representing the image H. The manuscript reading instruction is an instruction to read the image H of a document G. The different setting instructions are instructions to change different settings of the inkjet recording apparatus 1. Note that the enlargement ratio specified instruction will be described later in detail with reference to FIG. 7.

The display section 82 is, for example, a display with a touch screen function, and disposed in the operation panel. Examples of the display include a liquid crystal display and an organic electroluminescent (EL) display. This sort of display section 82 doubles as the input section 81. Specifically, the display section 82 includes a screen and a touch sensor and displays various images on the screen. Examples of the various images include software buttons and an enlargement ratio selection image. Note that the enlargement ratio selection image will be described later in detail with reference to FIG. 7.

The reader 20 includes a document conveyor device 21, a contact glass 22, and a scanner (an optical system) 23. A tray of the document conveyor device 21 or the contact glass 22 allows the document G to be put on. The contact glass 22 is, for example a rectangular glass plate. The document G is, for example a first sheet of paper P1 with a first image H1 and a second image H2 formed thereon. The reader 20 reads the images of the document G according to the document reading instruction. The reader 20 also generates image data based on the read images. For example, the reader 20 may read a first mark image M1 from a first side P1A of the first sheet of paper P1 and also read a second mark image M2 from a second side P1B thereof.

The paper feeder 90 includes a cassette 91 and a sheet feed roller 92. The cassette 91 allows (a sheet of) paper P to be fed (picked up) by the sheet feed roller 92. The cassette 91 is attached to the apparatus housing 100 in a detachable manner and disposed in a lower portion of the inside of the apparatus housing 100. Sheets of paper P are stored in the cassette 91 in a stacked state. The sheet feed roller 92 is disposed above one end side of the cassette 91. The sheet feed roller 92 conveys the paper P in the cassette 91 to the feed assembly 50.

The feed assembly 50 is disposed on one side of the image forming section 30. The feed assembly 50 has plural pairs of conveyance rollers 51 constituting a feed route 53 for the paper P. The plural pairs of conveyance rollers 51 allow (a sheet of) paper P conveyed from the cassette 91 to be conveyed to the image forming section 30 along the feed route 53. In the present embodiment, the feed assembly 50 has a pair of registration rollers 52 that functions as a pair of conveyance rollers 51. The pair of registration rollers 52 is disposed on the exit side of the feed route 53. The pair of registration rollers 52 may temporarily hold (a sheet of) paper P and then convey (the sheet of) paper P to the image forming section 30 in accordance with the print timing.

The image forming section 30 forms images H on (a sheet of) paper P. A method of the image forming section 30 forming the images H on (the sheet of) paper P may be an ink jet recording method. The image forming section 30 is disposed above the paper feeder 90. As already described with reference to FIG. 1A, the image forming section 30 includes the recording head 31 and the paper conveyance mechanism 32.

The recording head 31 includes a head 311. Specifically, the head 311 forms images H by using ink K on (a sheet of) paper P being transferred by the paper conveyance mechanism 32. In the present embodiment, the image forming section 30 has four heads 311Y, 311M, 311C, and 311K arranged from upstream to downstream in a paper conveyance direction. Each of the heads 311Y, 311M, 311C, and 311K includes plural nozzles (not shown) arranged in a width direction (Y-direction) of the paper conveyance mechanism 32. The nozzles deposit the ink K on, for example the first side P1A of a first sheet of paper P1. The head 311 is called a line type. For example, a line head 311 is fixed to the apparatus housing 100.

The controller 10 controls the image forming section 30 so that, when the duplex printing instruction is entered into the input section 81, a first image H1 and a first mark image M1 are formed on the first side P1A and then a second image H2 and a second mark image M2 are formed on the second side P1B. The controller 10 further controls the image forming section 30 so that a first image H1 is formed on the third side P2A of a second sheet of paper P2 and then an enlarged second image HS is formed on the fourth side P2B.

For example, the controller 10 may control the head 311 so that ink K is deposited on the first side P1A with the first side P1A facing an output surface of the head 311 while the sheet of paper P1 is attached to the paper conveyance mechanism 32. The controller 10 may also control the head 311 so that ink K is deposited on the second side P1B with the second side P1B facing the output surface of the head 311 while the sheet of paper P1 is attached to the paper conveyance mechanism 32.

The paper conveyance mechanism 32 includes a support roller 321, a drive roller 322, tension rollers 323, a conveyor belt 324, and a suction section 325.

The conveyor belt 324 forms an endless loop and is wound around the support roller 321, the drive roller 322, and the tension roller 323 in a stretched state. The conveyor belt 324 receives (a sheet of) paper P from the feed assembly 50 and transfers the (sheet of) paper P to the paper exit assembly 60. The conveyor belt 324 has through holes (not shown) pierced in the conveyor belt 324 along the thickness direction thereof.

The suction section 325 functions as a suction device such as a fan or a vacuum pump. The suction section 325 is driven, thereby generating negative pressure. The negative pressure acts on (a sheet of) paper P supported by one surface of the conveyor belt 324 via the through holes of the conveyor belt 324, so that the (sheet of) paper P is sucked onto the conveyor belt 324.

The drive roller 322 is disposed with a space between the drive roller 322 and the support roller 321 in the paper conveyance direction. The drive roller 322 is driven by a driver, thereby rotating. The driver is, for example a motor. The drive roller 322 causes the conveyor belt 324 to circulate in a first direction (direction D1 depicted by an arrow) and a second direction (direction D2 depicted by an arrow). The first direction is a conveyance direction of paper P. The second direction is an opposite direction of the first direction D1. The tension roller 323 is disposed below between the support roller 321 and the drive roller 322, and provides the conveyor belt 324 with tension.

The paper exit assembly 60 is disposed on the other side of the image forming section 30. The paper exit assembly 60 has an exit tray 62 and plural pairs of conveyance rollers 61 constituting an exit route 63. The exit tray 62 is disposed on the other side outside the apparatus housing 100. The conveyance rollers 61 convey a single-sided printed paper P conveyed from the paper conveyance mechanism 32 to the exit tray 62 along the exit route 63.

The reverse conveyance section 70 is a conveyance section for performing duplex printing. The reverse conveyance section 70 is disposed above the image forming section 30. The reverse conveyance section 70 has plural pairs of conveyance rollers 71 constituting a reverse route 72. In the case of duplex printing, for example, a first sheet of paper P1 with an image H formed on the first side P1A is conveyed to the reverse conveyance section 70 via the paper exit assembly 60. A conveyance direction of the first sheet of paper P1 conveyed to the reverse conveyance section 70 is switched in the reverse route 72. The first sheet of paper P1 is then conveyed to the paper conveyance mechanism 32 again with an unprinted side (second side P1B) facing the head 311. The recording head 31 deposits ink K on the second side P1B of the first sheet of paper P1 being conveyed to the paper conveyance mechanism 32 again.

As explained above with reference to FIGS. 1A to 3 in the present embodiment, it is preferable that the inkjet recording apparatus 1 further include the reader 20. The reader 20 reads a first mark image M1 from the first side P1A of a first sheet of paper P1 and reads a second mark image M2 from the second side P1B. The controller 10 calculates a size of a discrepancy between a first reference location Q1 and a second reference location Q2 based on a reading result by the reader 20. It is accordingly possible to reduce time-consuming work of a user visually recognizing a discrepancy between the first reference location Q1 and the second reference location Q2 with respect to the first sheet of paper P1. It is therefore possible to improve convenience in duplex printing.

Figure 4:
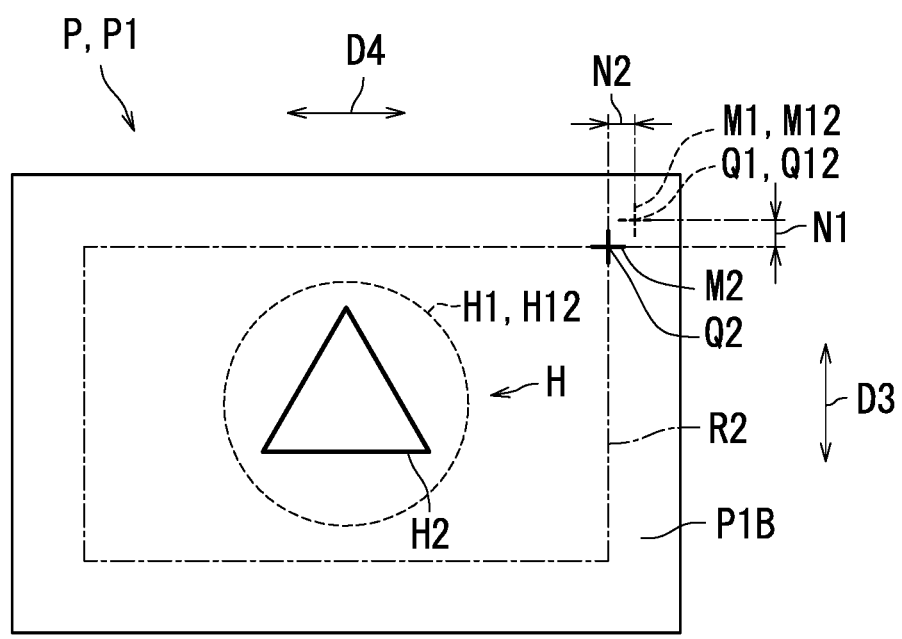
FIG. 4 illustrates a first sheet of paper.

The enlargement ratio will next be described in detail with reference to FIGS. 4 to 7 besides FIGS. 1A to 3. Each of FIGS. 4 to 5B illustrates a first sheet of paper P1. As shown in FIG. 4, it is preferable that the enlargement ratio include a first enlargement ratio and a second enlargement ratio. Specifically, a discrepancy between the first reference location Q1 and the second reference location Q2 includes a first difference N1 and a second difference N2. The first difference N1 is a difference between the first reference location Q1 and the second reference location Q2 in the main scanning direction D3 of the recording head 31. The second difference N2 is a difference between the first reference location Q1 and the second reference location Q2 in the sub-scanning direction D4. The sub-scanning direction D4 is perpendicular to the main scanning direction D3.

The enlargement ratio includes the first enlargement ratio and the second enlargement ratio. The first enlargement ratio represents an enlargement ratio for enlarging the second image H2 along the main scanning direction D3 based on the first difference N1. The second enlargement ratio represents an enlargement ratio for enlarging the second image H2 along the sub-scanning direction D4 based on the second difference N2. This enables the controller 10 to determine an enlargement ratio with respect to each of elongation of paper P along the main scanning direction D3 and elongation of the paper P along the sub-scanning direction D4. It is therefore possible to improve reduction precision of a discrepancy between printed locations in the case of duplex printing.

Figure 5A:
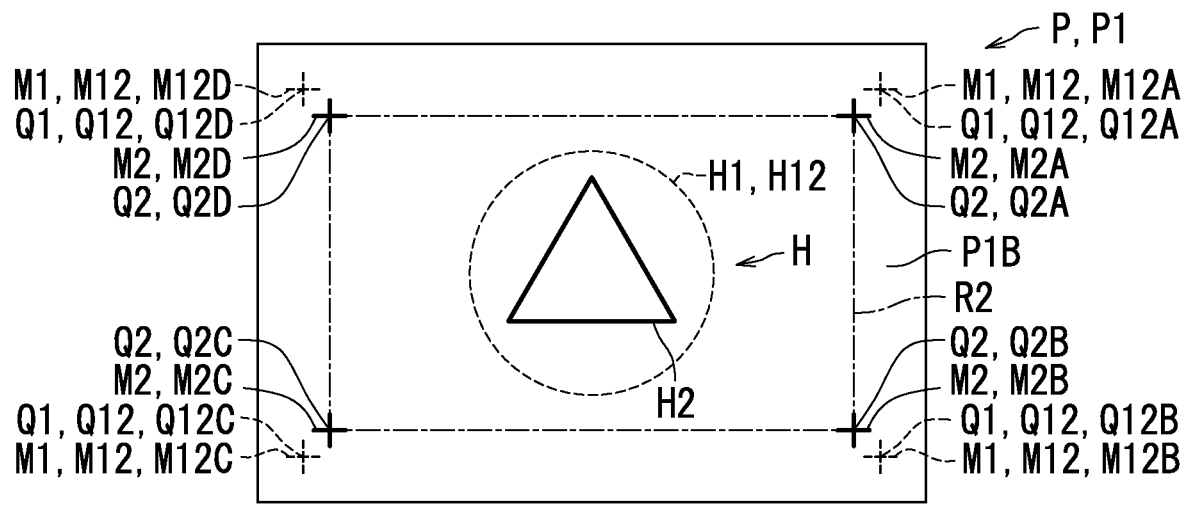
FIGS. 5A and 5B each illustrate a first sheet of paper.
Figure 5B:
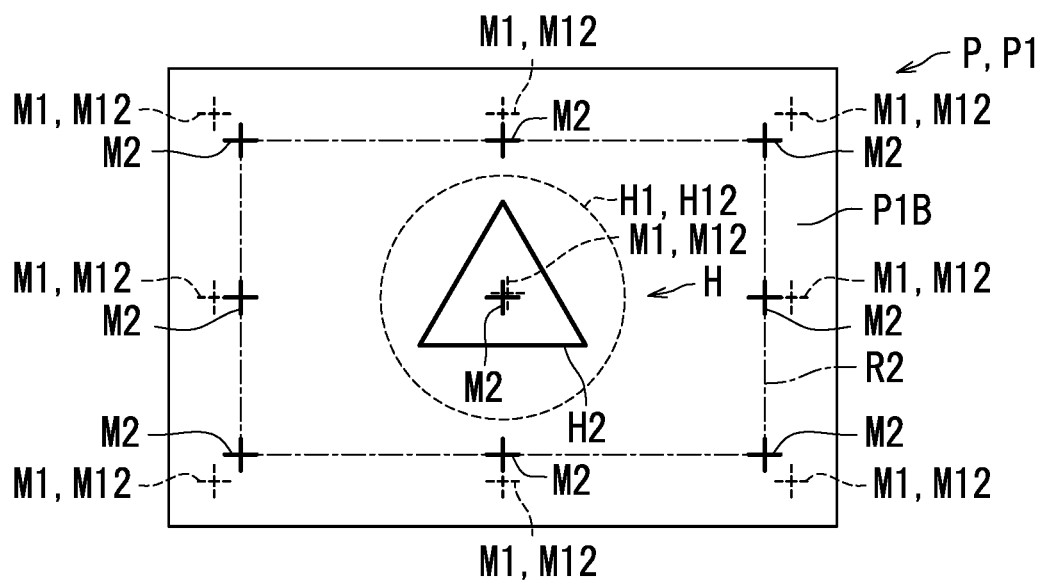

Note that the first mark image M1 may indicate first reference locations Q1 as shown in FIGS. 5A and 5B. Preferably, the first reference locations Q1 include respective positions of the four corners of the first rectangular region R1. The second mark image M2 may also include second reference locations Q2. Preferably, the second mark images M2 include respective positions of the four corners of the second rectangular region R2.

Specifically, as shown in FIG. 5A, the recording head 31 may form a first image H1 and first mark images M1 on the first side P1A of a first sheet of paper P1 based on first image data J1, and then form a second image H2 and second mark images M2 on the second side P1B based on second image data J2.

The first mark images M1 are first mark images M12A, M12B, M12C, and M12D. The first mark images M12A, M12B, M12C, and M12D represent first reference locations Q12A, Q12B, Q12C, and Q12D, respectively. The first reference locations Q12A, Q12B, Q12C, and Q12D correspond to four vertices of a first rectangular region R12 (see FIG. 1B), respectively.

The second mark images M2 are, for example, second mark images M2A, M2B, M2C, and M2D. The second mark images M2A, M2B, M2C, and M2D represent second reference locations Q2A, Q2B, Q2C, and Q2D, respectively. The second reference locations Q2A, Q2B, Q2C, and Q2D correspond to four vertices of a second rectangular region R2, respectively.

In the double-sided printed first sheet of paper P1, the first reference locations Q12A, Q12B, Q12C, and Q12D correspond to the second reference locations Q2A, Q2B, Q2C, and Q2D, respectively. This configuration enables the controller 10 to determine an enlargement ratio of the second image H2 based on respective discrepancies between the first reference locations Q12A, Q12B, Q12C, and Q12D and the second reference locations Q2A, Q2B, Q2C, and Q2D. This enables a user to compare discrepancies between the first reference locations Q1 and the second reference locations Q2 at the four corners of the first sheet of paper P1 and positions close thereto. It is therefore possible to easily recognize the discrepancies between the first reference locations Q1 and the second reference locations Q2 even when uneven stretching of the first sheet of paper P1 occurred. It is consequently possible to improve reduction precision of a discrepancy between printed locations in the case of duplex printing.

Furthermore, as shown in FIG. 5B, the first mark images M1 may include mark images disposed at respective midpoints of four sides of the first rectangular region R12, or include a mark image disposed at the center of the first rectangular region R12. Similarly, the second mark images M2 may include mark images disposed at respective midpoints of four sides of the second rectangular region R2, or include a mark image disposed at the center of the second rectangular region R2. This way enables a user to compare discrepancies between the first mark images M1 and the second mark images M2 at locations. It is therefore possible to improve reduction precision of a discrepancy between printed locations in the case of duplex printing.

Figure 6A:
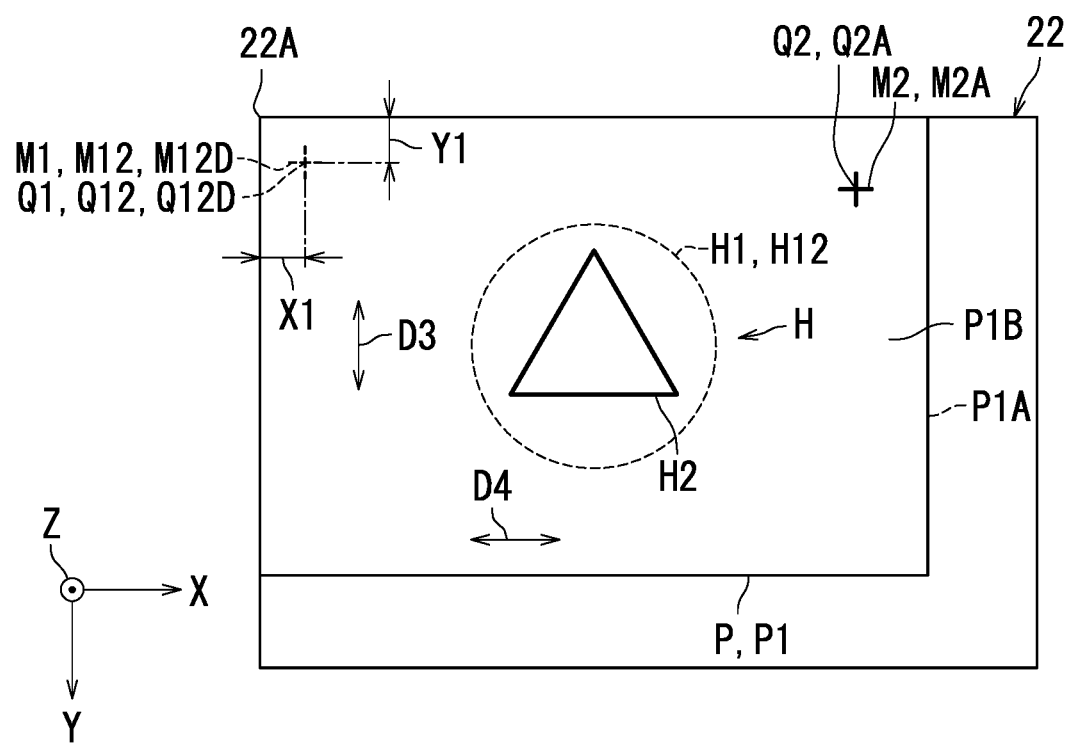
FIGS. 6A and 6B illustrate a contact glass and a first sheet of paper.
Figure 6B:
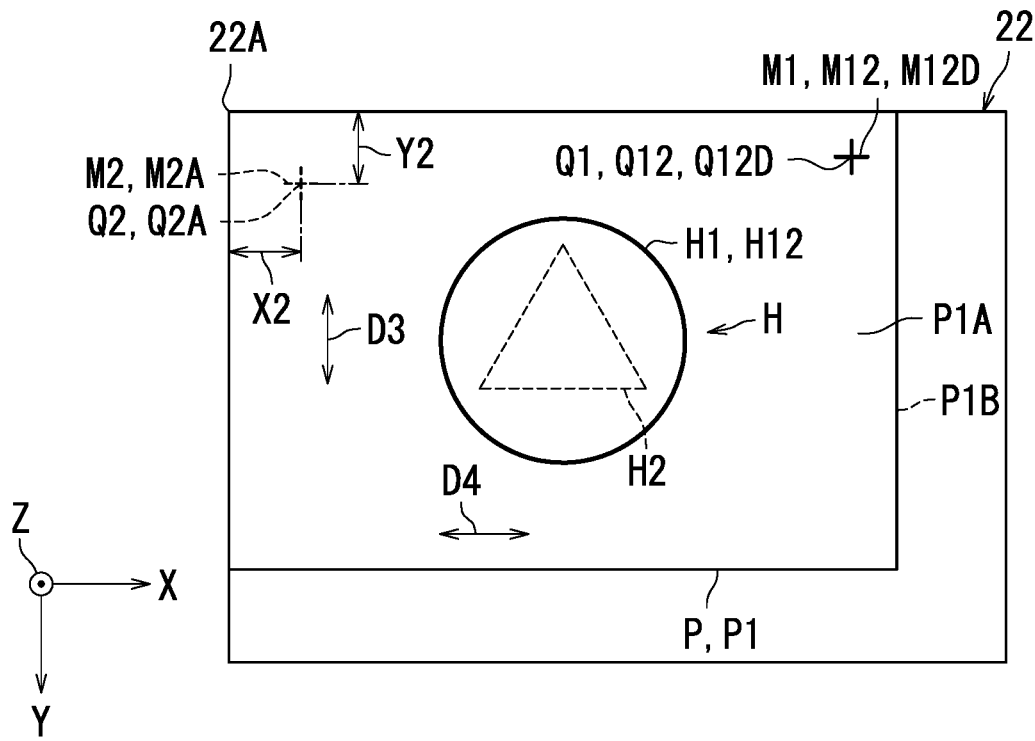

Furthermore, as shown in FIGS. 6A and 6B, it is preferable that the reader 20 (see FIG. 3) read a first mark image M1 and a second mark image M2 through the contact glass 22 from a first sheet of paper P1 disposed on the contact glass 22. FIGS. 6A and 6B illustrate the contact glass 22 and the first sheet of paper P1. Specifically, FIG. 6A is a plan view of the first sheet of paper P1 viewed from above in a vertical direction with the first side P1A being in contact with the contact glass 22. For example, according to a document reading instruction by a user, the scanner 23 reads the first mark image M12D through the contact glass 22 from the first side P1A of the first sheet of paper P1 disposed on the contact glass 22.

FIG. 6B is a plan view of the first sheet of paper P1 as viewed from above in a vertical direction with the second side P1B being in contact with the contact glass 22. For example, according to the document reading instruction by a user, the scanner 23 is to read the second mark image M2A through the contact glass 22 from the second side P1B of the first sheet of paper P1 disposed on the contact glass 22.

The controller 10 calculates a size of a discrepancy between the first reference location Q12D and the second reference location Q2A based on a difference between a first distance and a second distance. The first distance is a distance between a corner 22A of the contact glass 22 and the first reference location Q12D. Specifically, the first distance includes a third distance X1 and a fourth distance Y1 as shown in FIG. 6A. The third distance X1 is a distance between the corner 22A and the first reference location Q12D in the sub-scanning direction D4. The fourth distance Y1 is a distance between the corner 22A and the first reference location Q12D in the main scanning direction D3.

On the other hand, the second distance is a distance between the corner 22A of the contact glass 22 and the second reference location Q2A. Specifically, the second distance includes a fifth distance X2 and a sixth distance Y2 as shown in FIG. 6B. The fifth distance X2 is a distance between the corner 22A and the second reference location Q2A in the sub-scanning direction D4. The sixth distance Y2 is a distance between the corner 22A and the second reference location Q2A in the main scanning direction D3.

A difference between the third distance X1 and the fifth distance X2 corresponds to an example of the first difference N1 described with reference to FIG. 4. A difference between the fourth distance Y1 and the sixth distance Y2 corresponds to an example of the second difference N2 described with reference to FIG. 4. The controller 10 for example determines an enlargement ratio based on such a reading result depicted in the table below.

TABLE 1

| | First fixed form | | | |
|---|---|---|---|---|
| | Main scanning direction | | Sub-scanning direction | |
| Enlargement ratio | Paper width (mm) | First difference (mm) | Paper width (mm) | Second difference (mm) |
| 100.00% (Default value) | 128.000 | 0.000 | 182.000 | 0.000 |
| 100.05% | 128.064 | 0.064 | 182.091 | 0.091 |
| 100.10% | 128.128 | 0.128 | 182.182 | 0.182 |
| 100.15% | 128.192 | 0.192 | 182.273 | 0.273 |
| 100.20% | 128.256 | 0.256 | 182.364 | 0.364 |
| 100.25% | 128.320 | 0.320 | 182.455 | 0.455 |
| 100.30% | 128.384 | 0.384 | 182.546 | 0.546 |

The above table shows reading results by the reader 20 in a case where the first sheet of paper P1 is a first fixed form of paper. The first fixed form of paper is an example of the paper P that is smallest in size. In the above table, default values represent respective values when the first fixed form of paper does not expand. Paper widths other than default values in the main scanning direction D3 are obtained by adding first differences N1 to paper widths of the default values. Paper widths in the sub-scanning direction D4 are obtained by adding second differences N2 to paper widths of the default values. The controller 10 calculates enlargement ratios by dividing paper widths other than the default values by the paper widths of the default values. In this way, the controller 10 determines seven different first enlargement ratios with respect to, for example the second image data J2 in the main scanning direction D3. Similarly, the controller 10 determines seven different second enlargement ratios with respect to, for example the second image data J2 in the sub-scanning direction D4. The seven different first enlargement ratios are 100.00%, 100.05%, 100.10%, 100.15%, 100.20%, 100.25% and 100.30%. The seven different second enlargement ratios are also 100.00%, 100.05%, 100.10%, 100.15%, 100.20%, 100.25% and 100.30%. Information on the first and second enlargement ratios is stored in the storage 40.

TABLE 2

| | Second fixed form | | | |
|---|---|---|---|---|
| | Main scanning direction | | Sub-scanning direction | |
| Enlargement ratio | Paper width (mm) | First difference (mm) | Paper width (mm) | Second difference (mm) |
| 100.00% (Default value) | 320.000 | 0.000 | 457.200 | 0.000 |

TABLE 2-continued

| | Second fixed form | | | |
|---|---|---|---|---|
| | Main scanning direction | | Sub-scanning direction | |
| Enlargement ratio | Paper width (mm) | First difference (mm) | Paper width (mm) | Second difference (mm) |
| 100.05% | 320.160 | 0.160 | 457.429 | 0.229 |
| 100.10% | 320.320 | 0.320 | 457.657 | 0.457 |
| 100.15% | 320.480 | 0.480 | 457.886 | 0.686 |
| 100.20% | 320.640 | 0.640 | 458.114 | 0.914 |
| 100.25% | 320.800 | 0.800 | 458.343 | 1.143 |
| 100.30% | 320.960 | 0.960 | 458.572 | 1.372 |

The above table shows reading results by the reader 20 in a case where the first sheet of paper P1 is the second fixed form of paper. The second fixed form of paper is an example of paper P that is largest in size. In the same way as when the first sheet of paper P1 is the first fixed form of paper, the controller 10 determines first and second enlargement ratios.

As explained above with reference to FIGS. 6A and 6B, the present embodiment causes the reader 20 to read a first mark image M1 and a second mark image M2 through the contact glass 22 from the first sheet of paper P1 disposed on the contact glass 22. The controller 10 then calculates a size of a discrepancy between the first reference location Q1 and the second reference location Q2 based on a difference between the first distance and the second distance. This enables the controller 10 to determine an enlargement ratio of the second image data J2 with respect to each of the main scanning direction D3 and the sub-scanning direction D4. It is therefore possible to improve reduction precision of a discrepancy between printed locations in the case of duplex printing through a simple configuration.

Figure 7:
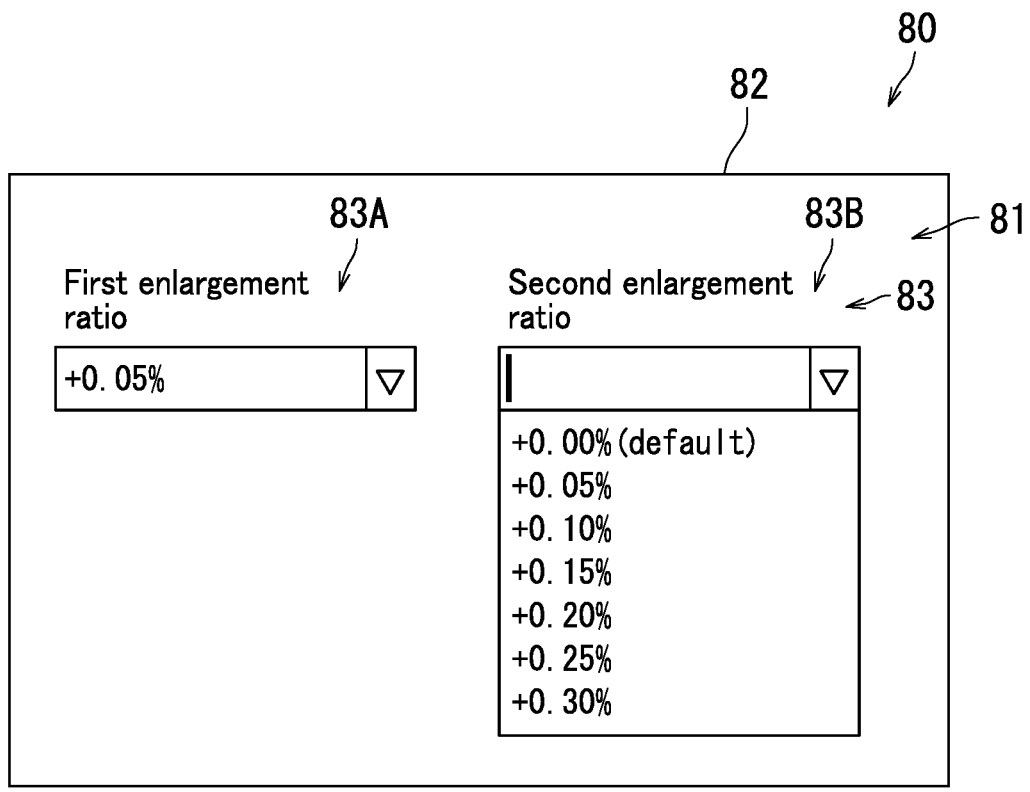
FIG. 7 illustrates an input display section.

Note that enlargement ratio specified instructions may be entered into the input section 81 as shown in FIG. 7. FIG. 7 illustrates the input display section 80. Specifically, the controller 10 controls the display section 82 so that an enlargement ratio selection image 83 is displayed thereon. The enlargement ratio selection image 83 is an image that allows a user to select respective enlargement ratios in order to enter enlargement ratio specified instructions. The enlargement ratio selection image 83 includes a first enlargement ratio selection image 83A and a second enlargement ratio selection image 83B. This configuration enables the user to select, for example, one each from the seven different first enlargement ratios and the seven different second enlargement ratios through the first enlargement ratio selection image 83A and the second enlargement ratio selection image 83B, respectively. By selecting a first enlargement ratio and a second enlargement ratio, a corresponding enlargement ratio specified instruction is to be entered into the input section 81. This enables a user to specify and change enlargement ratios based on a discrepancy between the first reference location Q1 and the second reference location Q2. It is therefore possible to adjust the enlargement ratio to a desired enlargement ratio according to convenience in the case of duplex printing.

Figure 8:
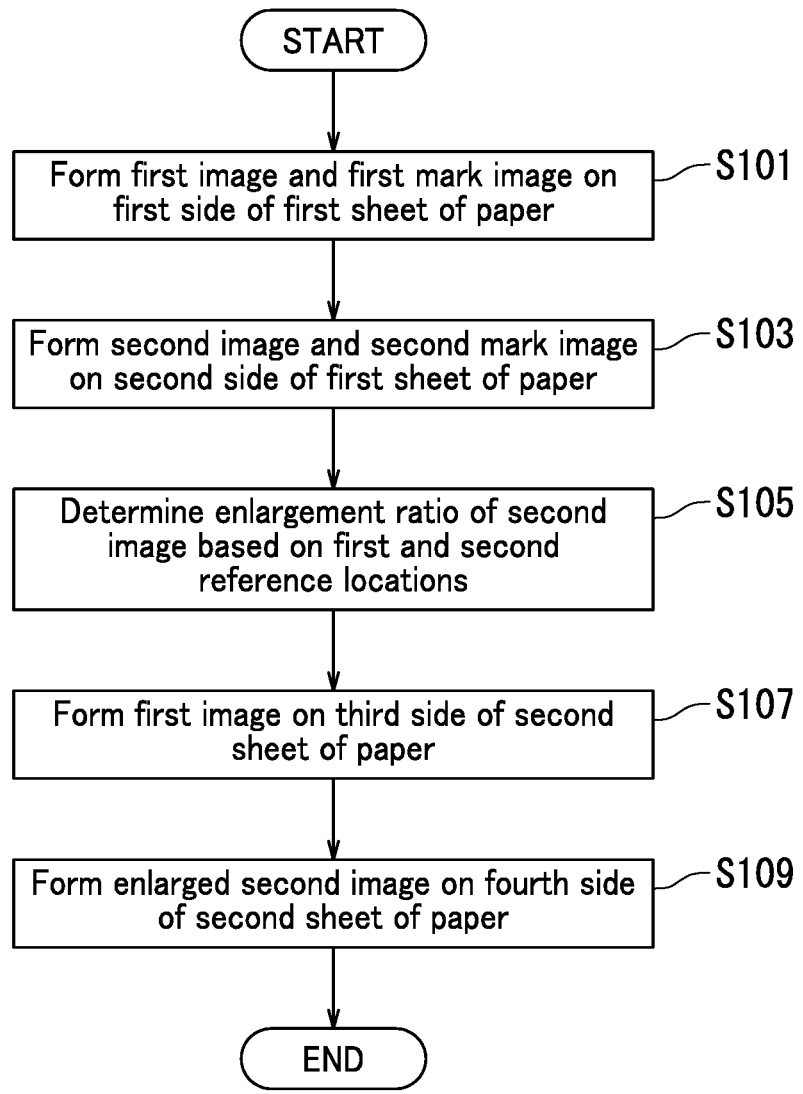
FIG. 8 is a flow chart showing a duplex printing process.

An operation of the inkjet recording apparatus 1 will next be described with reference to FIGS. 1A to 8. FIG. 8 is a flow chart depicting a duplex printing process. The inkjet recording apparatus 1 carries out steps S101 to S109, thereby performing duplex printing with respect to each of the first sheet of paper P1 and the second sheet of paper P2. Specifically, it is as follows.

At step S101, the recording head 31 forms a first image H1 and a first mark image M1 on the first side P1A of a first sheet of paper P1. The process proceeds to step S103.

At step S103, the recording head 31 then forms a second image H2 and a second mark image M2 on the second side P1B of the first sheet of paper P1. The process proceeds to step S105.

At step S105, the controller 10 then determines an enlargement ratio of a second image H2 to be formed on the fourth side P2B of a second sheet of paper P2 based on a discrepancy between the first reference location Q1 and the second reference location Q2. The process proceeds to step S107.

At step S107, the recording head 31 then forms a first image H1 on the third side P2A of the second sheet of paper P2. The process proceeds to step S109.

At step S109, the recording head 31 then forms an enlarged second image HS on the fourth side P2B of the second sheet of paper P2. The process then ends.

Figure 9:
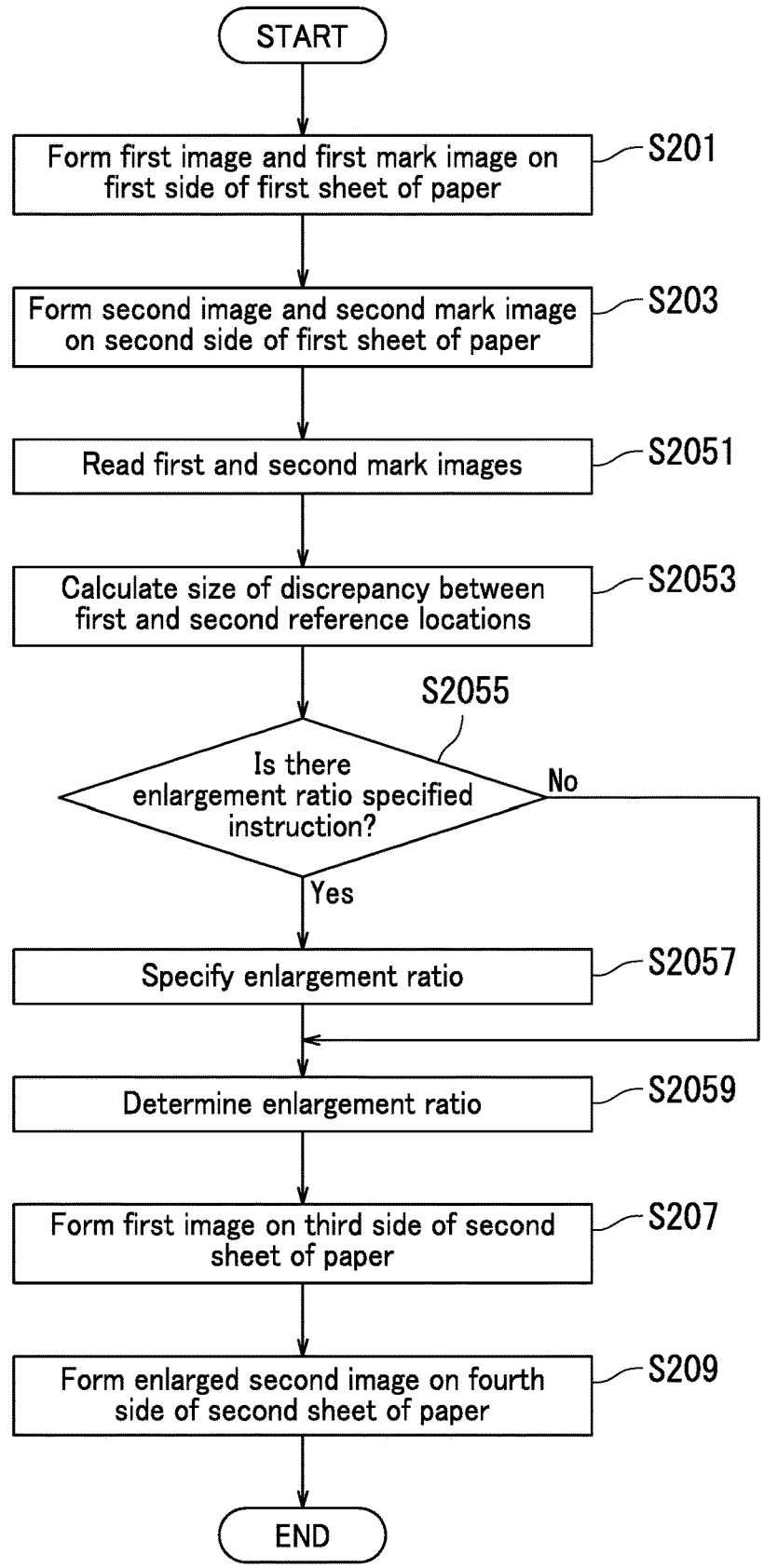
FIG. 9 is a flow chart showing a duplex printing process.

An operation of the inkjet recording apparatus 1 will next be described with reference to FIGS. 1A to 9. FIG. 9 is a flow chart depicting a duplex printing process. The inkjet recording apparatus 1 carries out steps S201 to S209, thereby performing duplex printing with respect to each of a first sheet of paper P1 and a second sheet of paper P2. Note that steps S2051 to S2057 shown in FIG. 9 are an example of a sub-process corresponding to step S105 explained with reference to FIG. 8. Specifically, it is as follows.

Steps S201 and S203 shown in FIG. 9 correspond to steps S101 and S103 described with reference to FIG. 8, respectively, and like tasks are carried out. The process proceeds to step S2051.

At step S2051, the reader 20 then reads a first mark image M1 from the first side P1A of the first sheet of paper P1, and reads a second mark image M2 from the second side P1B. The process proceeds to step S2053.

At step S2023, the controller 10 then calculates a size of a discrepancy between the first reference location Q1 and the second reference location Q2. The process proceeds to step S2055.

At step S2055, the controller 10 then judges whether or not an enlargement ratio specified instruction is entered into the input section 81. When the enlargement ratio specified instruction is entered ("Yes" at step S2055), the process proceeds to step S2057. When no enlargement ratio specified instruction is entered ("No" at step S2055), the process proceeds to step S2059.

In the case of "Yes" at step S2055, an enlargement ratio of the second image H2 is specified at step S2057. The process proceeds to step S2059.

In the case of "No" at step S2055, or after step S2057, the controller 10 determines the enlargement ratio of the second image H2 at step S2059. The process proceeds to S207.

Steps S207 and S209 shown in FIG. 9 correspond to steps S107 and S109 described with reference to FIG. 8, respectively, and like tasks are carries out. The process then ends.

Note that according to user setting, steps S2051 and S2053 shown in FIG. 9 may be omitted, or steps S2055 and S2057 may be omitted.

The embodiments of the present disclosure have been described above with reference to the drawings (FIGS. 1A to 9). Note that the present disclosure is not limited to the above embodiments, and can be implemented in various aspects without departing from the scope of the present disclosure. The present disclosure can also include various embodiments obtained by appropriately combining the component elements of the embodiments. For example, some component elements may be deleted from all the component elements shown in the embodiments. Furthermore, component elements over different embodiments may appropriately be combined. In order to facilitate understanding, the drawings mainly show schematic component elements, and thickness, length, number, interval and the like of each illustrated component element differ from those of a corresponding actual component element for convenience of drawing creation. In addition, respective materials, shapes, dimensions and the like of the component elements shown in the above-described embodiments are merely examples, and not limited thereto in particular. Therefore, various changes are possible without departing substantially from the configurations of the present disclosure.

(1) As described with reference to FIG. 5B, the first mark image M1 may overlap the first image H1 in a case where the first mark image M1 is disposed at the center of the first rectangular region R12. Moreover, the second mark image M2 may overlap the second image H2 in a case where the second mark image M2 is disposed at the center of the second rectangular region R2. The present disclosure is, however, not limited thereto. For example, when a first image H1 and a first mark image M1 are formed on the first side P1A of a first sheet of paper P1, the first mark image M1 may be formed with a white space being put in the periphery of part that is of the whole region of the first image H1 and overlaps the first mark image M1. Similarly, when a second image H2 and a second mark image M2 are formed on the second side P1B of the first sheet of paper P1, the second mark image M2 may be formed with a white space being put in the periphery of part that is of the whole region of the second image H2 and overlaps the second mark image M2. This example enables a user to easily visually recognize a discrepancy between the first reference location Q12 and the second reference location Q2.

What is claimed is:
1. An inkjet recording apparatus, comprising:
a paper conveyance mechanism configured to convey plural sheets of paper;
a recording head configured to form, by using ink, an image on each of the sheets of paper being conveyed based on image data; and
a controller configured to control respective operations of the paper conveyance mechanism and the recording head, wherein
the sheets of paper include a first sheet of paper and a second sheet of paper,
the first sheet of paper has a first side and a second side being a back side of the first side,
the second sheet of paper has a third side and a fourth side being a back side of the third side,
the image data contains first image data representing a first image and second image data representing a second image,
the recording head forms the first image and a first mark image on the first side based on the first image data, and then forms the second image and a second mark image on the second side based on the second image data,
the first mark image represents a first reference location in a first rectangular region in which the first image is to be formed,
the second mark image represents a second reference location in a second rectangular region in which the second image is to be formed, and
the controller determines an enlargement ratio of the second image to be formed on the fourth side based on a discrepancy between the first reference location and the second reference location.

2. The inkjet recording apparatus according to claim 1, wherein
the recording head forms the first image on the third side based on the first image data, and then forms an enlarged second image on the fourth side based on the second image data and the enlargement ratio, wherein
the enlarged second image is an image obtained by enlarging the second image according to the enlargement ratio.

3. The inkjet recording apparatus according to claim 1, further comprising
an input section that allows an enlargement ratio specified instruction to be entered thereinto, wherein
the enlargement ratio specified instruction designates the enlargement ratio.

4. The inkjet recording apparatus according to claim 1, wherein
the discrepancy includes a first difference and a second difference, wherein
the first difference is a difference between the first reference location and the second reference location in a main scanning direction of the recording head, and
the second difference is a difference between the first reference location and the second reference location in a sub-scanning direction perpendicular to the main scanning direction, and
the enlargement ratio includes a first enlargement ratio and a second enlargement ratio, wherein
the first enlargement ratio is an enlargement ratio for enlarging the second image along the main scanning direction based on the first difference, and
the second enlargement ratio is an enlargement ratio for enlarging the second image along the sub-scanning direction based on the second difference.

5. The inkjet recording apparatus according to claim 1, comprising, as the first mark image and the second mark image, first mark images and second mark images, respectively,
each of the first mark images representing a first reference location in the first rectangular region, and
each of the second mark images representing a second reference location in the second rectangular region.

6. The inkjet recording apparatus according to claim 5, wherein
the first reference locations include respective positions of four corners of the first rectangular region; and
the second reference locations include respective positions of four corners of the second rectangular region.

7. The inkjet recording apparatus according to claim 1, further comprising
a reader configured to read the first mark image from the first side, and read the second mark image from the second side, wherein
the controller calculates a size of the discrepancy based on a reading result by the reader.

8. The inkjet recording apparatus according to claim 7, wherein
the reader includes a contact glass that has a rectangular plate shape,
the first sheet of paper is rectangular,
the reader reads the first mark image and the second mark image through the contact glass from the first sheet of paper disposed on the contact glass, and
the controller calculates the size of the discrepancy based on a difference between a first distance and a second distance, wherein
the first distance is a distance between a corner of the contact glass and the first reference location; and
the second distance is a distance between the corner and the second reference location.

* * * * *